United States Patent [19]

Pearce

[11] Patent Number: 5,754,853
[45] Date of Patent: May 19, 1998

[54] SYSTEM FOR EXECUTING UTILITY PROGRAMS WHILE PRESERVING THE STATE OF A NATIVE OPERATING SYSTEM

[75] Inventor: John J. Pearce, Austin, Tex.

[73] Assignee: Dell USA, LP, Round Rock, Tex.

[21] Appl. No.: 572,952

[22] Filed: Dec. 15, 1995

[51] Int. Cl.$^6$ .................................................. G06F 9/00
[52] U.S. Cl. ........................................................ 395/652
[58] Field of Search ................................. 395/678, 651, 395/652, 750, 653

[56] References Cited

U.S. PATENT DOCUMENTS

| | | | |
|---|---|---|---|
| 5,027,273 | 6/1991 | Letwin | 364/200 |
| 5,167,030 | 11/1992 | Spilo | 395/425 |
| 5,386,552 | 1/1995 | Garney | 395/575 |
| 5,398,333 | 3/1995 | Schieve et al. | 395/575 |
| 5,535,397 | 7/1996 | Durante et al. | 395/740 |
| 5,539,879 | 7/1996 | Pearce et al. | 395/184.01 |
| 5,592,675 | 1/1997 | Itoh et al. | 395/750 |
| 5,600,840 | 2/1997 | Pearce et al. | 395/750 |

*Primary Examiner*—Alvin E. Oberley
*Assistant Examiner*—Sue Lao
*Attorney, Agent, or Firm*—Skjerven, Morrill, MacPherson, Franklin & Friel LLP; Ken J. Koestner

[57] ABSTRACT

A system uses a suspend-to-disk operation to save the total processor state of a computer system. With the processor state saved, utility programs such as diagnostic and setup routines, which access to all computer system resources, are executed without the need to reload executing applications or reboot the native operating system controlling the computer system prior to activating the suspend-to-disk operation.

26 Claims, 8 Drawing Sheets

SYSTEM FOR EXECUTING UTILITY PROGRAMS WHILE PRESERVING THE STATE OF A NATIVE OPERATING SYSTEM

FIELD OF INVENTION

This invention relates to computer system utility programs. More specifically, this invention relates to an apparatus and method for executing utility programs and diagnostics while preserving the state of the native operating system.

BACKGROUND OF THE INVENTION

System setup routines and diagnostic program generally require exclusive access to all computer system resources. This requirement raises several problems.

For example, in various computer systems, the system setup routine is implemented in embedded code storage (firmware) using a flash memory system. Embedded code storage is inherently space-limited so that a system setup routine employing a large amount of program code, for example a routine implemented within a graphical user interface, is not feasible.

Furthermore, various other computer systems employ a system setup routine which is supplied in firmware in conjunction with a basic input/output system (BIOS). The system setup routine requires a reboot operation to set up any system (BIOS). The system setup routine requires a reboot operation to set up any data structures associated with the system setup operation. This reboot requirement is time-consuming and a hindrance for computer users who wish to quickly activate and inactivate power management features in various operating system environments.

An additional problem is that a computer user must reboot the computer system to execute diagnostic programs that execute outside of native operating system control. An operating system which is activated by bootstrap loading from a disk drive may be called a native operating system. The file system of the master set of programs making up the native operating system may be called a native file system. When the diagnostic programs are complete, the computer user must reboot the operating system to return to the original operating system and reload application programs to perform application work. The computer user must expend unproductive time performing both the reboot operation and reloading of application programs.

What is needed is a method and apparatus for providing exclusive access to all resources of the computer system to utility programs, such as system setup and diagnostic routines, without requiring the computer user to reboot and without restricting the size of the programs to the program space available in flash memory.

SUMMARY OF THE INVENTION

In accordance with the present invention, a system uses a suspend-to-disk operation to save the total processor state of a computer system. With the processor state saved, utility programs such as diagnostic and setup routines that access all computer system resources, are executed without the need to reload executing applications or reboot the native operating system controlling the computer system prior to activating the suspend-to-disk operation.

In accordance with one embodiment of the present invention, a method of executing a utility program on a computer system while preserving the state of a native operating system includes steps of designating a utility program for execution and suspending an operating state of the native operating system to a storage device. The method further includes the steps of executing the designated utility program and, upon termination of the utility program, restoring the operating state of the native operating system from the storage device.

In accordance with a second embodiment of the invention, a utility program operates on a computer system having a processor, a memory and a hard disk drive. The utility program includes an interactive routine that selects a utility routine for execution and a utility designation routine responsive to the interactive routine which designates the selected utility routine for activation. The utility program also includes a suspend-to-disk routine that saves a current operating state of the computer system to a storage device, a utility routine and a boot routine which invokes a system bootstrap operation. A resume-from-disk (RFD) routine, which is responsive to the bootstrap operation, restores the saved operating state of the computer system.

Numerous advantages are achieved by the method and apparatus discussed above. One advantage is that utility programs and diagnostics having access to all computer system resources are executed while avoiding side effects between the utility programs and diagnostics, on one hand, and the operating system on the other hand. Another advantage is that utility programs and diagnostics have access to all system resources without hindrance from an overlying native operating system. Still another advantage is that the operating system and the diagnostic and utility system are mutually independent and noninteracting so that performance of the active system is not influenced by the inactive system.

It is advantageous that the disclosed method and apparatus provides for temporal allocation of all system resources to either of two operating systems, a native operating system for standard processing and a utility operating system for utility and diagnostic operations. Transfer between these systems is achieved without the computer user entering a bootstrap command or reloading application programs.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION

Figure 1:
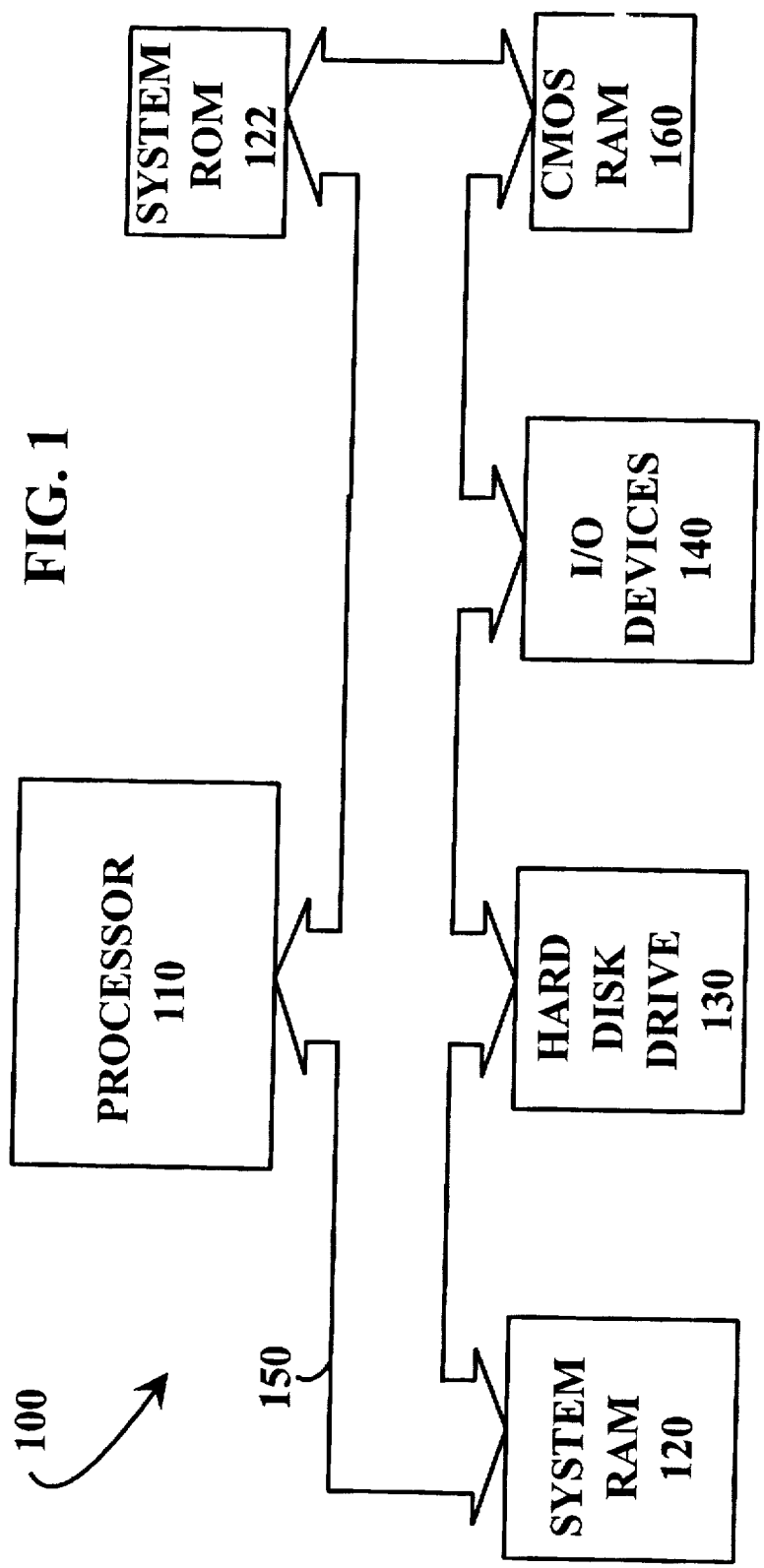
FIG. 1 is a block diagram which depicts computer system hardware upon which a system for implementing an operating system independent method for operating a utility program in accordance with the present invention.

Referring to FIG. 1, a computer system 100 is shown which runs a system for running utility programs and diagnostics while preserving the state of the native operating system. The computer system 100, typically a personal computer, includes a processor 110, a system random access memory (RAM) 120, a system ROM 122, a hard disk drive 130 and various other peripheral input/output devices 140. These system components communicate via a bus 150 which includes data, address and control lines. A CMOS clock nonvolatile RAM 160, which is connected to the processor 110, is typically utilized to store information even when power to the computer system 100 is interrupted. Program instructions that make up the system for creating an operating system independent environment are stored in a storage device such as the hard disk drive 130 or the system ROM 122 connected to the processor 110.

Figure 2A:
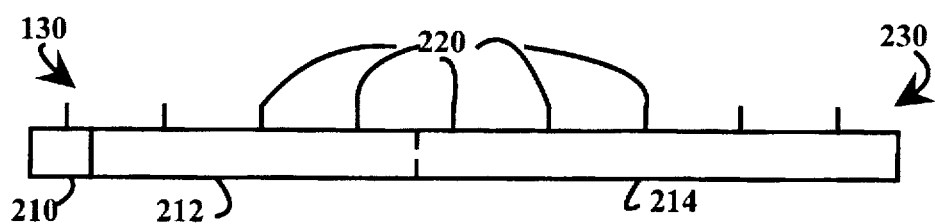
FIGS. 2A, 2B and 2C are block diagrams showing, respectively, formatting of a hard disk, a partition table entry and a hierarchy of pointers for an extended partition in the computer system shown in FIG. 1.

FIG. 2A is a block diagram showing the format of the hard disk drive 130. Various aspects of the disk drive format are conventional and comply with operating standards in the computer industry. Other aspects of the disk drive format are modified from the standard format in accordance with the present invention. The hard disk drive 130 includes a partition sector 210 which is a standard structure in IBM compatible personal computers for defining partitions of a hard disk. The hard disk drive 130 also includes a native operating system partition 212. The remaining sectors of the hard disk drive 130 are available for storage of user data 214. Several cylinders 220 make up the hard disk drive 130. The physical embodiment of the hard disk drive 130 is referred to as a physical disk drive 230 hereinafter.

Figure 2B:
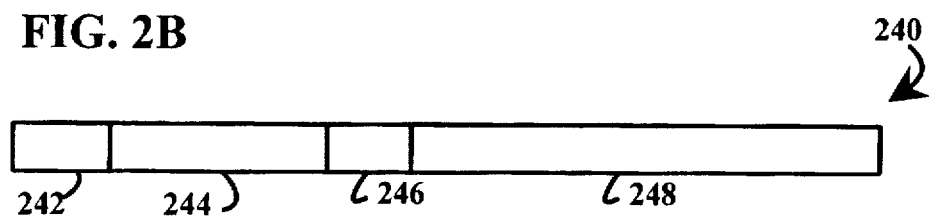

The partition sector 210 contains a partition table (not shown) which includes multiple table entries, each of which correspond to a partition of the hard disk drive 130. FIG. 2B illustrates a format of a partition table entry 240. A first field entry 242 of the partition table entry 240 designates whether the partition described by the partition table entry is a bootable partition. A second field 244 indicates the physical location of the beginning of the partition on the hard disk drive 130, addressed according to head, sector and cylinder. A third field 246 of the partition table entry 240 indicates the physical location of the end of the partition on the hard disk drive 130. A remaining field 248 contains additional information relating to the partition. Typically, the first entry in the partition table (entry 0) defines the native operating system partition 212.

Figure 2C:
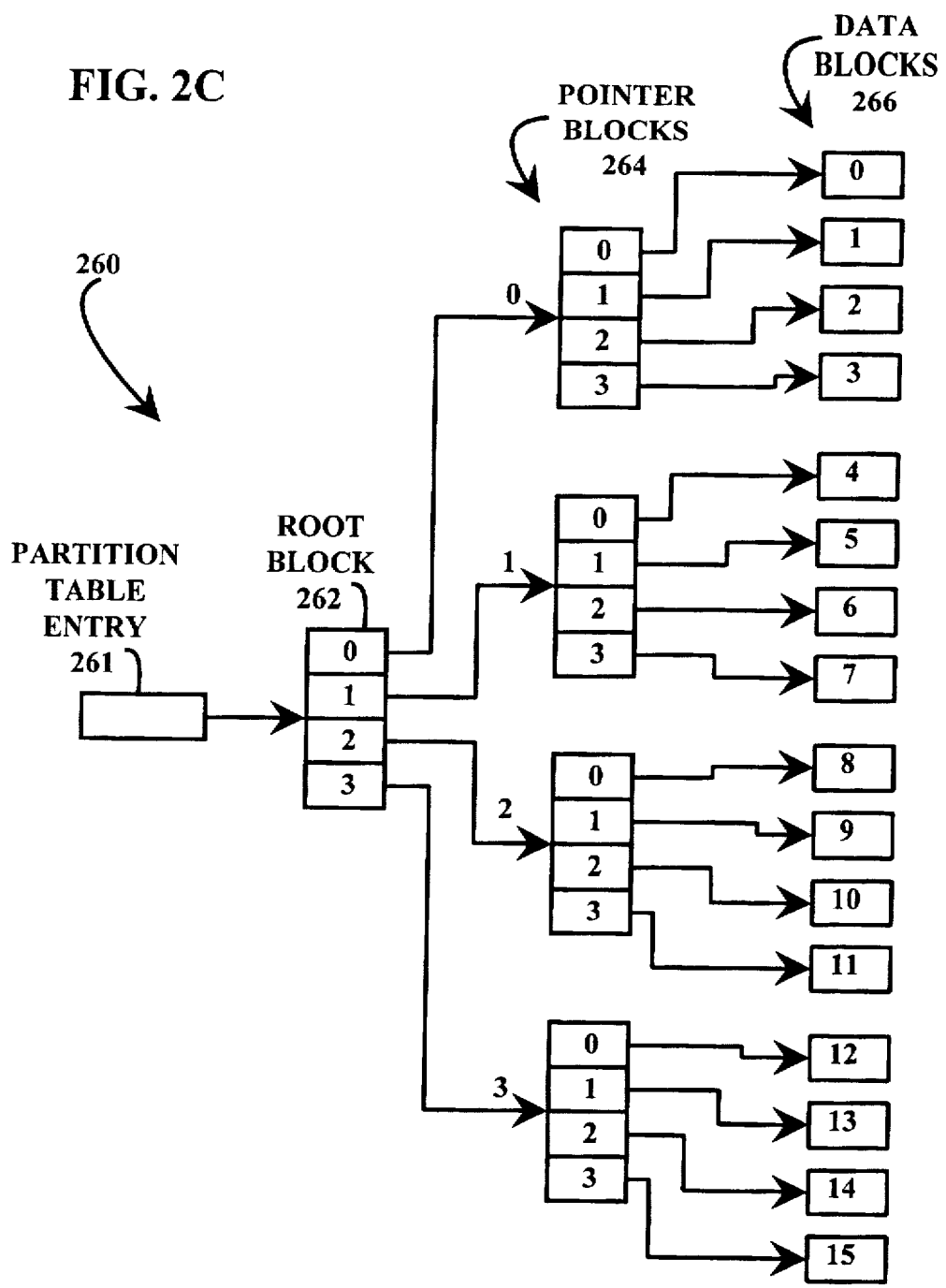

A suspend-to-disk (S2D) partition is configured as an extended partition of the hard disk drive 130. The extended partition is defined using a hierarchy of pointers to indicate locations of available data blocks in the user data area 214 of the hard disk drive 130 that are available for usage in the extended partition. FIG. 2C is a block diagram showing this hierarchy of pointers 260. A S2D partition table entry (entry 1) 261 points to a S2D partition 332 shown in FIG. 3B. The hierarchy of pointers 260 begins at the start of the S2D partition 332. Referring again to FIG. 2C, a root block 262—the beginning level of the hierarchy of pointers 260 -is located at the beginning of the S2D partition 332. The root block 262 includes m entries number 0 through m-1. Each of the m entries point to one of m pointer blocks 264. Similarly, each of the m pointer blocks 264 points to one of n data blocks 266. The n data blocks are numbered 0 through n-1. The size of the root, pointer and data blocks directly depends on the size of the S2D partition to be created. In the embodiment illustrated in FIG. 2C, both parameters m and n are equal to four so that the total number of data blocks is sixteen.

A pointer block entry that points to a selected data block during the S2D utility operation is set by dividing a number identifying the selected data block by the number of pointers in each pointer block. The quotient and remainder resulting from this division operation respectively designate the appropriate pointer block and the pointer block entry containing the pointer to the selected data block. For example, referring to the block diagram of FIG. 2C, the pointer to a data block 11 is located by dividing 11 by the number of pointers in each data block. In this example, the number of pointers in each data block is four so that the quotient resulting from the division operation in equal to 2 and the remainder is three. Thus, the pointer to pointer block 2 is contained in entry 3 of pointer block 2 of the root block 262. A pointer to pointer block 2 is contained in entry 2 of root block 262.

Figure 3A:
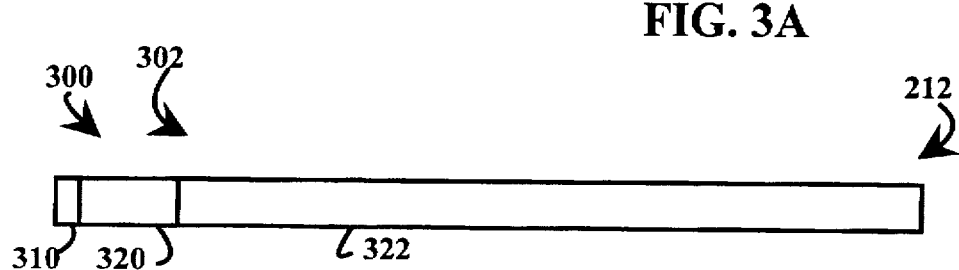
FIGS. 3A and 3B are block diagrams which show, respectively, a format of a native operating system on a hard disk drive and a format of a suspend-to-disk (S2D) partition on the hard disk drive within the native operating system.

A block diagram of a native file system 300 of a native operating system partition 212 on a physical disk drive 230 is depicted in FIG. 3A. The native operating system partition 212 includes multiple sectors including a boot sector 310 and a native operating system reserved area 320. The boot sector 310 typically occupies more than a single sector of the native operating system partition 212. The native operating system reserved area 320 is used for various purposes by the operating system. One purpose of the reserved area 320 is to indicate where various data is located in the native operating system partition 212. In the DOS operating system, the native operating system reserved area 320 is a file access table (FAT). In the Unix operating system, the native operating system reserved area 320 includes a root directory and allocation table. A user data area 322 follows the native operating system reserved area 320 for usage by a computer system user.

Figure 3B:
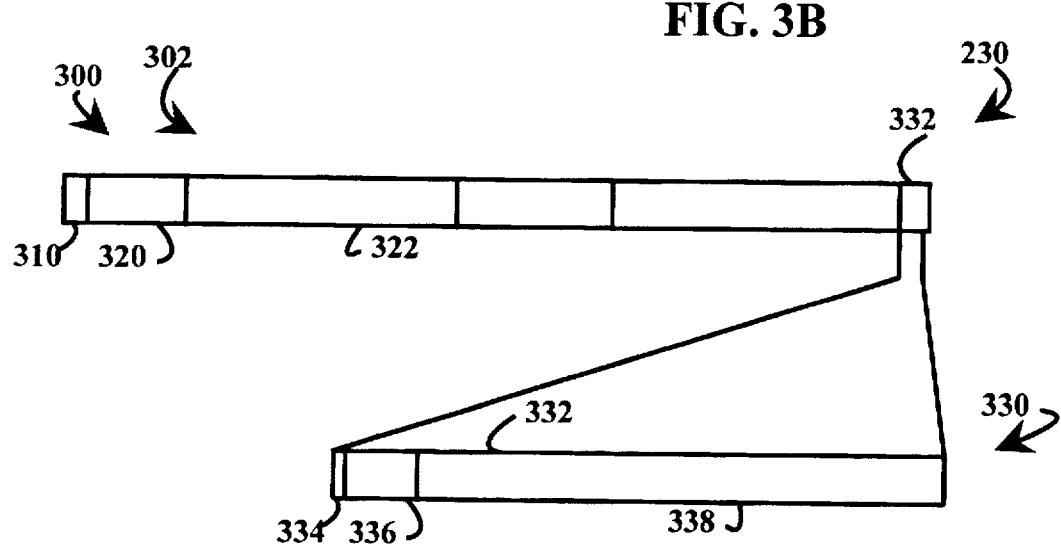

FIG. 3B shows a block diagram of a S2D partition 332 within the user data area 322 of the native file system 300. The S2D partition 332 includes a boot sector 334, a root block 336 and an S2D data area 338.

Figure 4:
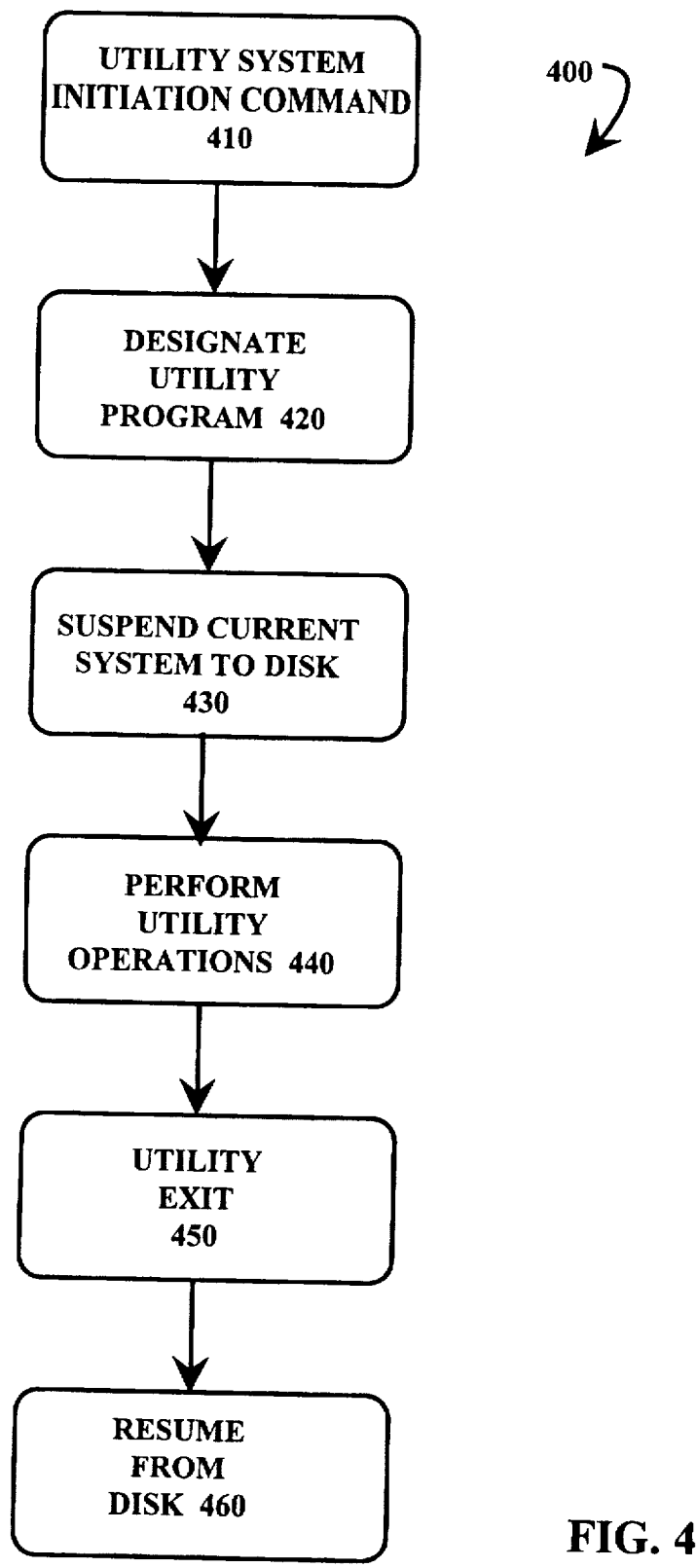
FIG. 4 is a flowchart which illustrates steps of a utility system for running utility programs and diagnostics while preserving the state of the native operating system.

FIG. 4 is a flowchart which illustrates steps of a utility system 400 for running utility programs and diagnostics while preserving the state of the native operating system. A first step in the utility system 400 is a utility system initiation command 410 which starts operation of the utility system. In designate utility program step 420, the particular utility or diagnostic routine to be run is identified and designated for activation. A suspend current system to disk step 430 saves the system currently operational on the processor to the hard disk 130 using a suspend to disk (S2D) operation and starts the utility operation. When the S2D operation is complete, the utility designated for activation executes in perform utility operations step 440. The utility program is run until terminated in utility exit step 450. Upon exit of the utility, the utility system 400 immediately invokes normal bootstrap operation which, in turn, activates a resume-from-disk operation in RFD step 460. Instructions for program routines of the utility system 400, such as the suspend-to-disk (S2D) and resume-from-disk (RFD) utilities, are stored in a program storage device connected to the processor 110, such as the system ROM 122.

In typical embodiments, the utility system initiation command 410 request is issued in the form of a standard command, written to a computer system console. In other embodiments, the utility system initiation command 410 is implemented in various other forms. For example, a form of "hot key" is defined in some embodiments to actuate a utility system initiation operation. In other embodiments, two mouse keys are depressed simultaneously to actuate the utility system initiation command. In further embodiments, an icon is provided for a graphical user interface so that clicking of a mouse or other hand-operated pointing device on the icon actuates the utility system initiation command.

The designate utility program step 420 sets suitable storage locations, such as memory locations, registers and the like, to identify the particular utility or diagnostic routine to be run once the current operating state is saved. In some embodiments, the utility system initiation command 410 provides the identity of the utility or diagnostic. In other embodiments, the designate utility program step 420 receives information interactively to identify the selected utility program.

In one embodiment of the utility system 400, the suspend current system to disk step 430 saves the system currently operational on the processor to a utility partition (not shown) of the hard disk 130. The utility partition is a portion of the hard disk 130 that is reserved for usage while executing utility programs. In another embodiment, the suspend current system to disk step 430 reserves a space outside the normal file system for holding the native operating state while executing the utility programs. In a further embodiment, the suspend current system to disk step 430 is passed a vector of hard disk sector identifiers to specify the sectors of the hard disk 130 for holding the current system during execution of utility programs. In still another embodiment, the suspend current system to disk step 430 includes a make partition utility 500 that is run prior to running the utility system 400.

Figure 5:
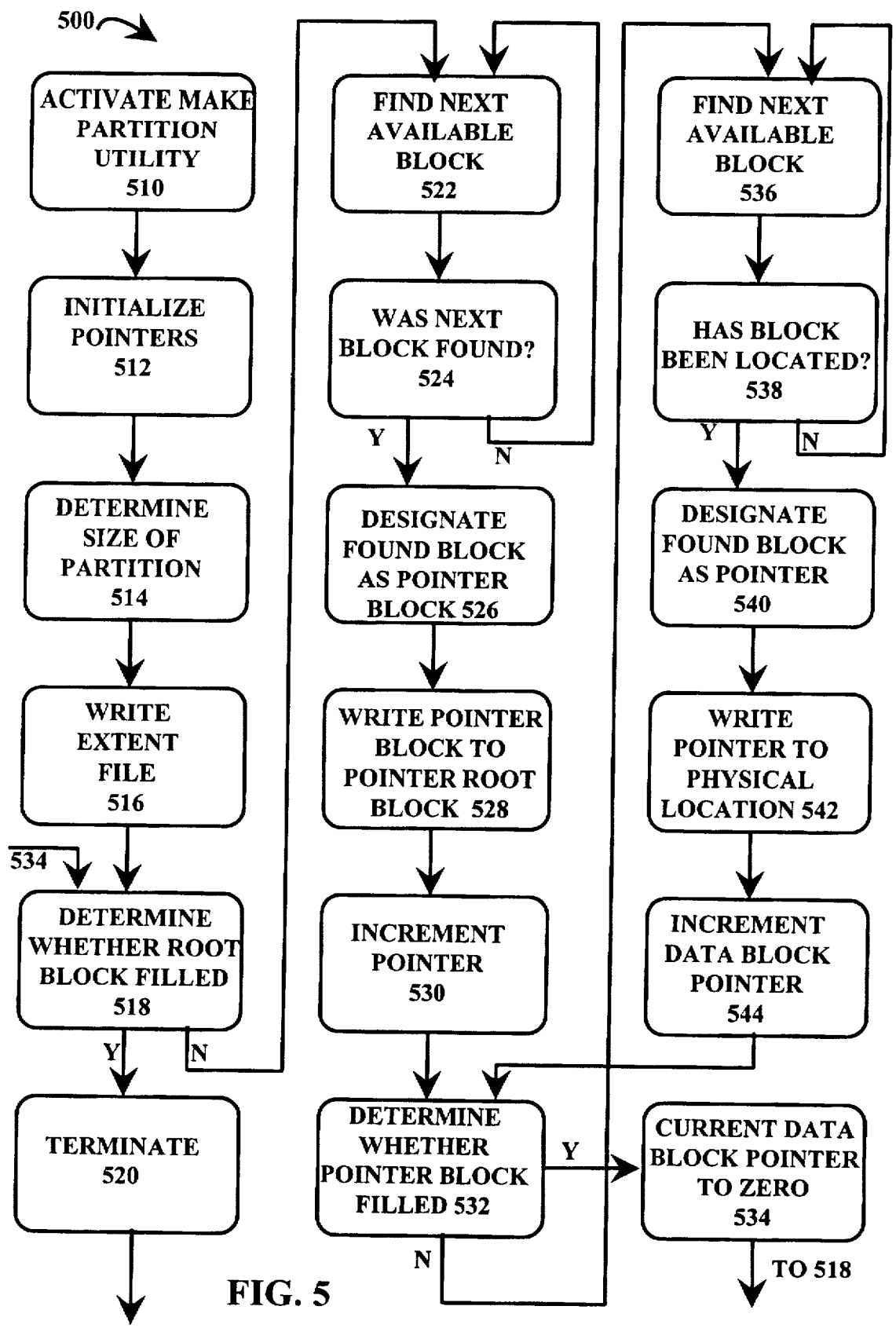
FIG. 5 is a flowchart showing of the operation of the make partition utility which creates an extended partition of a size appropriate to accommodate storage of the S2D partition shown in FIG. 3B.

A flowchart of the operation of the make partition utility 500 is illustrated in FIG. 5. The make partition utility 500 creates an extended partition of a size appropriate to accommodate storage of the S2D partition 332 shown in FIG. 3B. Execution of the make partition utility 500 is initiated when a computer user activates the make partition utility 500 in step 510. In step 512, variables i and j, which respectively designate a current pointer block and a current data block, are initialized to zero. In step 514, the size of the extended partition suitable to hold the S2D partition 332, the number of pointer blocks (m) 264 and the number of data blocks (n) 266 for each pointer block 264 are determined. In step 516, the native operating system partition 212 is used to write an "extent" file, which is subsequently used for storing pointer blocks 264 and data blocks 266. The extent file may be configured as a contiguous file or a noncontiguous file in various embodiments of the system. Typically, the extent file includes disk space located within the user area alone.

In step 518, the value of the current pointer block variable i is compared with the value stored in the pointer block variable m to determine whether the root block 262 is completely filled. If the root block 262 is completely filled, control proceeds to step 520 in which execution of the make partition utility 500 is terminated. If the root block 262 is not completely filled, control proceeds to step 522, in which the physical disk drive 230 is read to find the next available block of the extent file written in step 516. Step 524 determines whether the next available block was found in step 522. If not, control returns to step 522 to continue searching for the next block. Otherwise, in step 526, the located block is designated as pointer block i. In step 528, a pointer to the physical location of pointer block i on the physical disk drive 230 is written to entry i of the root block 262 and, in step 530, variable i is incremented by 1.

Step 532 determines whether pointer block i is completely filled by comparing the value of the current data block variable j to the value stored in the pointer block variable n. If so, step 534 sets the current data block variable j to zero and the make partition utility 500 returns to step 518 to begin searching for the next pointer block. If the pointer block i is not completely filled, step 536 reads the physical disk drive 230 to find the next available block of the extent file. Step 538 determines whether a block has been located. If not, the next available block is sought in step 536. Otherwise, in step 540, the located block is designated as data block j. Step 542 then writes a pointer to the physical location of the data block j to entry j of pointer block i. In step 544 variable j is incremented by 1 and the procedure returns to step 532. In this manner, the root block 262 and pointer blocks 264 are appropriately filled with pointers to the locations of the pointer blocks 246 and the data blocks 266, respectively, on the physical disk drive 230.

Figure 6:
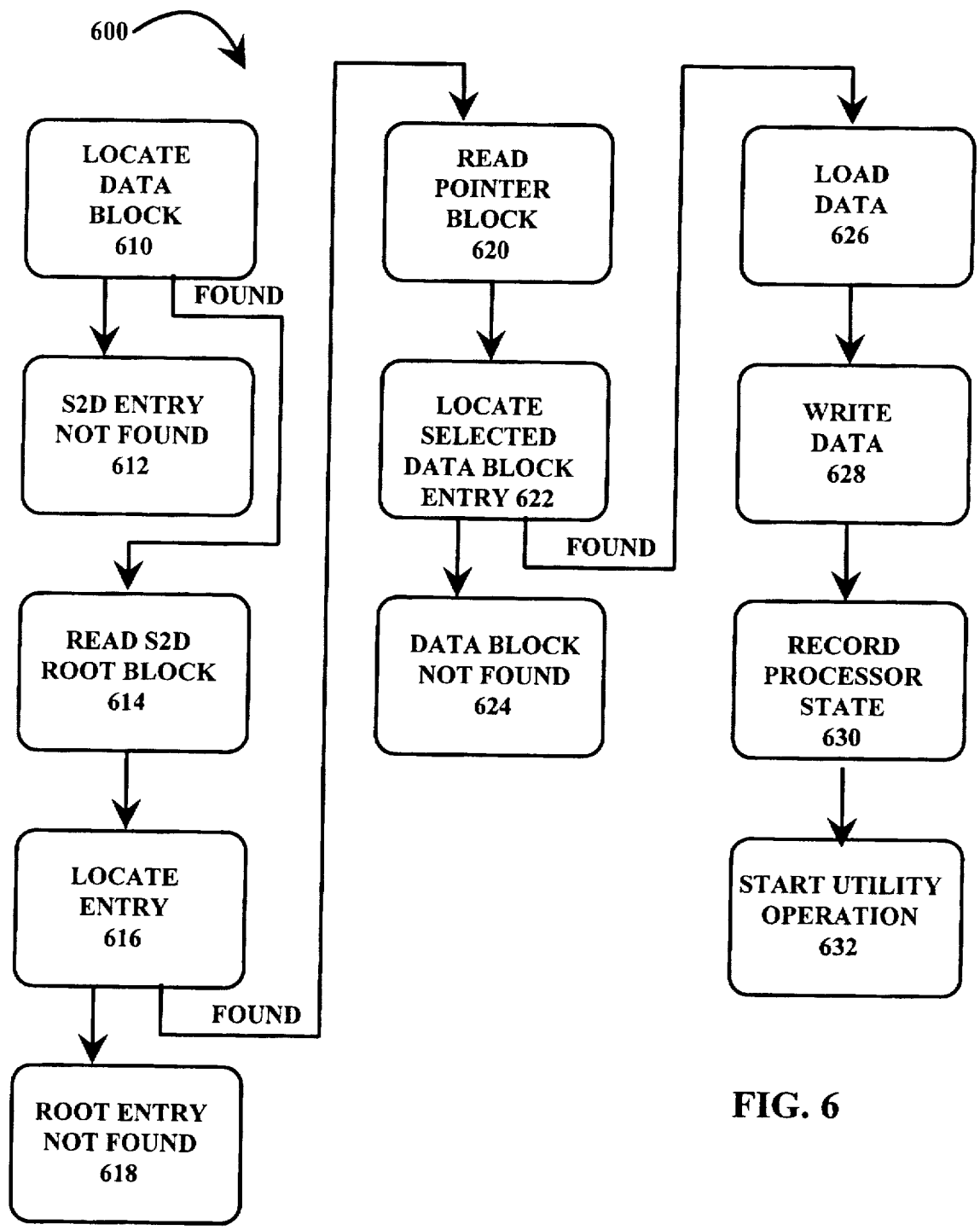
FIG. 6 is a flowchart which illustrates execution steps of an exemplary embodiment of a suspend-to-disk (S2D) utility.

FIG. 6 is a flowchart which illustrates execution steps of an exemplary embodiment of a suspend-to-disk (S2D) utility 600. In locate data block step 610, the S2D utility locates a selected data block of an extended memory file by looping through the partition table (not shown) in the partition sector 210 to locate an S2D partition 332 entry. If locate data block step 610 does not find an S2D entry, execution of the S2D utility terminates in S2D entry not found step 612. Otherwise, read S2D root block step 614 reads the S2D root block 262 located at the beginning of the S2D partition 332. Locate entry step 616 loops through the root block 262 to locate the entry that corresponds to the appropriate pointer block. Using the aforementioned example in which the data block 11 is sought, locate entry step 616 seeks entry 2 of root block 262. If this entry is not found, execution terminates in root entry not found step 618. Otherwise, read pointer block step 620 reads the pointer block from the hard disk 130. Locate selected data block entry step 622 loops through the pointer block to locate the entry corresponding to the selected data block. In the present example, the entry corresponding to the desired data block is entry 3. If the entry is not found, the S2D utility terminates in data block not found step 624. Otherwise, load data step 626 loads data from RAM. Write data step 628 writes the data loaded from RAM 120 to the selected data block. The S2D utility loads the total content of RAM 120, herein called the "total processor state" from RAM 120 and writes the total processor state to the hard disk 130. The S2D utility also saves the current system status including device states, application program status and the like to the RAM 120. Record processor state step 630 writes processor state variables such as instruction pointer (EIP) and register values to the hard disk 130. In start utility operations step 632, the S2D utility initiates the selected utility or diagnostic operation. Except for the start utility operations step 632, the S2D utility is similar to a conventional S2D utility. In a conventional S2D utility, a final step is disconnection of power from the computer system rather than initiation of a selected utility operation.

Perform utility operations step 440 begins when the S2D operation is complete. In some embodiments, the utility routine operates automatically, without interaction with a system operator. In these embodiments, interactive input from the system operator is received in conjunction with the utility system initiation command 410 or the designate utility program step 420. During perform utility operations step 440, the utility program executes until termination, for example by completion of the utility task or by interruption, in utility exit step 450. Following the utility exit, the utility system 400 immediately invokes normal bootstrap operation which, in turn, activates a resume-from-disk operation in RFD step 460.

Figure 7:
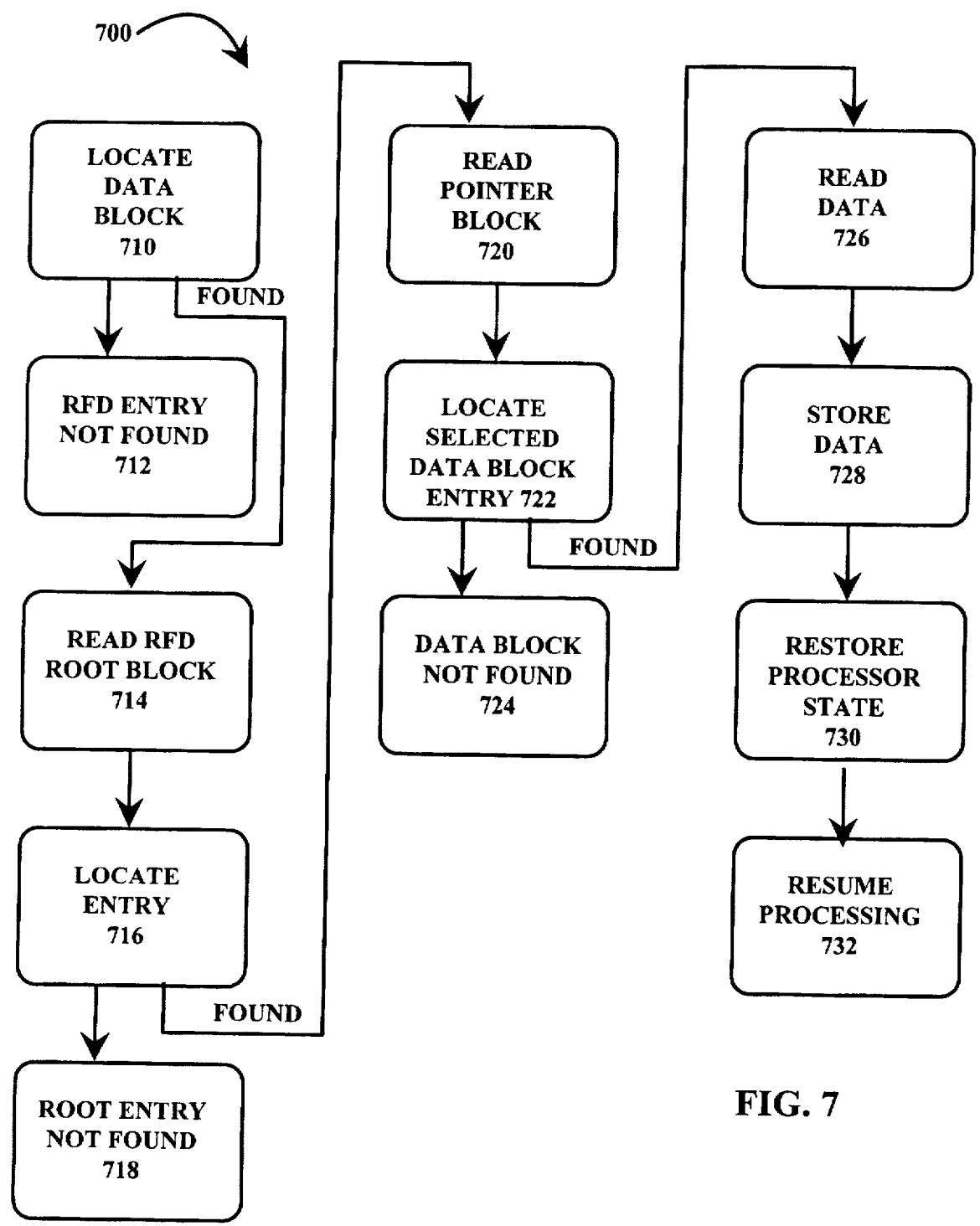
FIG. 7 is a flowchart which illustrates execution steps of an exemplary embodiment of a resume-from-disk (RFD) utility.

FIG. 7 is a flowchart which illustrates execution steps of an exemplary embodiment of a resume-from-disk (RFD) utility 700. In locate data block step 710, the RFD utility locates a selected data block of an extended memory file by looping through the partition table (not shown) in the partition sector 210 to locate an S2D partition 332 entry. If locate data block step 710 does not find an S2D entry, execution of the RFD utility terminates in RFD entry not found step 712. Otherwise, read RFD root block step 714 reads the S2D root block 262 located at the beginning of the S2D partition 332. Locate entry step 716 loops through the root block 262 to locate the entry that corresponds to the appropriate pointer block. Using the aforementioned example in which the data block 11 is sought, locate entry step 716 seeks entry 2 of root block 262. If this entry is not found, execution terminates in root entry not found step 718. Otherwise, read pointer block step 720 reads the pointer block from the hard disk 130. Locate selected data block entry step 722 loops through the pointer block to locate the entry corresponding to the selected data block. In the present example, the entry corresponding to the desired data block is entry 3. If the entry is not found, the RFD utility terminates in data block not found step 724. Otherwise, read data step 726 reads data from the selected data block on the hard disk 130. Store data step 728 stores the data read from the hard disk 130 to RAM. The RFD utility reads the total processor state from the hard disk 130 and stores the total processor state in RAM 120 so that the total content of RAM 120 is completely and accurately restored. Restore processor state step 730 reads processor state variables such as the recorded instruction pointer (EIP) and register values from the hard disk 130. In step 732, the RFD utility resumes execution of processor operations from the precise instruction at which operations were interrupted.

While the invention has been described with reference to various embodiments, it will be understood that these embodiments are illustrative and that the scope of the invention is not limited to them. Many variations, modifications, additions and improvements of the embodiments described are possible. The system for creating an operating system independent environment for executing utility programs disclosed herein may be used for many various purposes and implemented in multiple configurations.

I claim:

1. A method of executing a program on a computer system operating under control of a native operating system that limits program access to computer system resources the method comprising the steps of:

selecting a program for execution;

designating the selected program for activation;

saving a current operating state of the native operating system on a storage device using a suspend-to-disk (S2D) operation;

suspending operation of the native operating system so that program access to computer system resources is allowed;

executing the selected program with the program allowed access to computer system resources;

invoking a system bootstrap operation;

responsive to the system bootstrap operation, restoring the saved operating state of the native operating system using a resume-from-disk (RFD) operation; and resuming operation of the native operating system.

2. A method according to claim 1 wherein the suspend-to-disk (S2D) operation comprises the steps of:

loading the total content of a computer system random access memory (RAM);

writing the loaded RAM to the storage device; and writing processor state variables to the storage device.

3. A method according to claim 2 wherein the processor state variables are selected from a group of state variables including:

an instruction pointer (EIP);

general register values;

special register values;

device state parameters; and application program status.

4. A method according to claim 1 wherein the storage device is a magnetic hard disk.

5. A method according to claim 1 wherein the suspend-to-disk (S2D) operation saves the current operating state of the native operating system to a utility partition of a hard disk.

6. A method according to claim 1 wherein the suspend-to-disk (S2D) operation saves the current operating state of the native operating system to a space of a hard disk outside the normal file system.

7. A method according to claim 1 wherein the suspend-to-disk (S2D) operation saves the current operating state of the native operating system to sectors of a hard disk designated by a vector of hard disk sector identifiers.

8. A method according to claim 1 wherein the suspend-to-disk (S2D) operation saves the current operating state of the native operating system to a partition of a hard disk created using a make partition step.

9. A method of executing a program on a computer system while preserving the state of a native operating system that limits access to computer system resources, the method comprising the steps of:

designating a program for execution;

saving an operating state of the native operating system to a storage device;

suspending operation of the native operating system so that program access to computer system resources is allowed;

executing the designated program with the program allowed access to computer system resources; and upon termination of the program, restoring the operating state of the native operating system from the storage device, and resuming operation of the native operating system.

10. A method according to claim 9 further comprising the step of:

invoking a system bootstrap operation subsequent to the executing step and preceding the restoring step.

11. A method according to claim 9 wherein the suspend-to-disk (S2D) operation comprises the steps of:

loading the total content of a computer system random access memory (RAM);

writing the loaded RAM to the storage device; and writing processor state variables to the storage device.

12. A method according to claim 10 wherein the processor state variables are selected from a group of state variables including:

an instruction pointer (EIP);

general register values;

special register values;

device state parameters; and application program status.

13. A method according to claim 9 wherein the storage device is a magnetic hard disk.

14. A method according to claim 9 wherein the suspend-to-disk (S2D) operation saves the current operating state of the native operating system to a utility partition of a hard disk.

15. A method according to claim 9 wherein the suspend-to-disk (S2D) operation saves the current operating state of the native operating system to a space of a hard disk outside the normal file system.

16. A method according to claim 9 wherein the suspend-to-disk (S2D) operation saves the current operating state of the native operating system to sectors of a hard disk designated by a vector of hard disk sector identifiers.

17. A method according to claim 9 wherein the suspend-to-disk (S2D) operation saves the current operating state of the native operating system to a partition of a hard disk created using a make partition step.

18. A utility program operating on a computer system operating under control of a native operating system that limits program access to computer system resources the computer system having a processor, a memory and a hard disk drive, the utility program comprising:

an interactive routine which selects a utility routine for execution;

a utility designation routine responsive to the interactive routine which designates the selected utility routine for activation;

a suspend-to-disk routine which saves a current operating state of the native operating system to a storage device and suspends operation of the native operating system so that program access to computer system resources is allowed;

a utility routine including operations accessing computer system resources having access limited by the native operating system;

a boot routine which invokes a system bootstrap operation; and a resume-from-disk (RFD) routine responsive to the bootstrap operation which restores the saved operating state of the native operating system and reinstates operation of the native operating system.

19. A utility program operating on a computer system operating under control of a native operating system that limits program access to computer system resources, the computer system having a processor, a memory and a hard disk drive, the utility program comprising:

means for selecting a utility routine for execution;

means for designating the selected utility routine for activation;

a suspend-to-disk routine which saves a current operating state of the native operating system to a storage device and suspends operation of the native operating system so that program access to computer system resources is allowed;

a utility routine including operations accessing computer system resources having access limited by the native operating system;

means for invoking a system bootstrap operation; and a resume-from-disk (RFD) routine responsive to the bootstrap operation which restores the saved operating state of the native operating system and reinstates operation of the native operating system.

20. A method according to claim 1 wherein program is a utility routine that accesses computer system resources for which access is limited by the native operating system.

21. A computer program product comprising:

a computer usable medium having computable readable code embodied therein including program codes for performing the method according to claim 1.

22. A computer system comprising:

a processor;

a memory coupled to the processor;

a hard disk drive coupled to the processor, the hard disk driver for storing and the processor for executing a utility program including a computer usable medium having computable readable code embodied therein including program codes for performing the method according to claim 1.

23. A method according to claim 9 wherein program is a utility routine that accesses computer system resources for which access is limited by the native operating system.

24. A computer program product comprising:

a computer usable medium having computable readable code embodied therein including program codes for performing the method according to claim 9.

25. A computer system comprising:

a processor;

a memory coupled to the processor; and a hard disk drive coupled to the processor, the hard disk driver for storing and the processor for executing a utility program including a computer usable medium having computable readable code embodied therein including program codes for performing the method according to claim 9.

26. A computer system comprising:

a processor, a memory coupled to the processor; and a hard disk drive coupled to the processor, the hard disk driver for storing and the processor for executing the utility program according to claim 18.

\* \* \* \* \*